United States Patent

[11] 3,579,066

| [72] | Inventors | Clair A. Bearfield;<br>Raymond Cole, Valley City, N. Dak. |
|---|---|---|
| [21] | Appl. No. | 813,998 |
| [22] | Filed | Apr. 7, 1969 |
| [45] | Patented | May 18, 1971 |
| [73] | Assignee | Tri W-G Inc.<br>Valley City, N. Dak. |

[54] BRAKE MOTOR ATTACHMENT DEVICE
2 Claims, 5 Drawing Figs.

[52] U.S. Cl............................................................. 318/372,
310/77, 188/163
[51] Int. Cl........................................................... H02k 23/68
[50] Field of Search........................................... 310/77, 76,
79, 92, 93, 66; 188/163; 318/372

[56] References Cited
UNITED STATES PATENTS

| 2,214,807 | 9/1940 | Buckley | 318/372UX |
| 2,833,975 | 5/1958 | Currie | 318/372 |
| 2,145,255 | 1/1939 | Granberg | 188/163 |
| 2,149,940 | 3/1939 | Kylin | 188/163 |
| 2,392,068 | 1/1946 | Sexton | 188/163 |
| 2,479,344 | 8/1949 | Goldfield | 310/77 |
| 3,151,708 | 10/1964 | Trombetta | 188/163 |
| 3,339,681 | 9/1967 | Holladay | 188/163 |

Primary Examiner—Milton O. Hirshfield
Assistant Examiner—R. Skudy
Attorney—Robert E. Kleve ABSTRACT: The invention comprises a mechanical brake for an electric motor with a solenoid mechanically connected to a brakeshoe which upon deactuation of the solenoid automatically engages a brakedrum or the rotor of the electric motor to stop the rotation of the motor. The solenoid and electric motor being actuated and deactuated simultaneously and the brakeshoe engagement preventing coasting of the motor after electric current to the motor has been discontinued.

Patented May 18, 1971
3,579,066
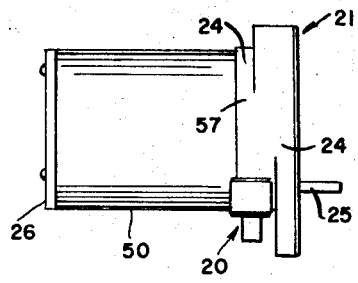
FIG.1.
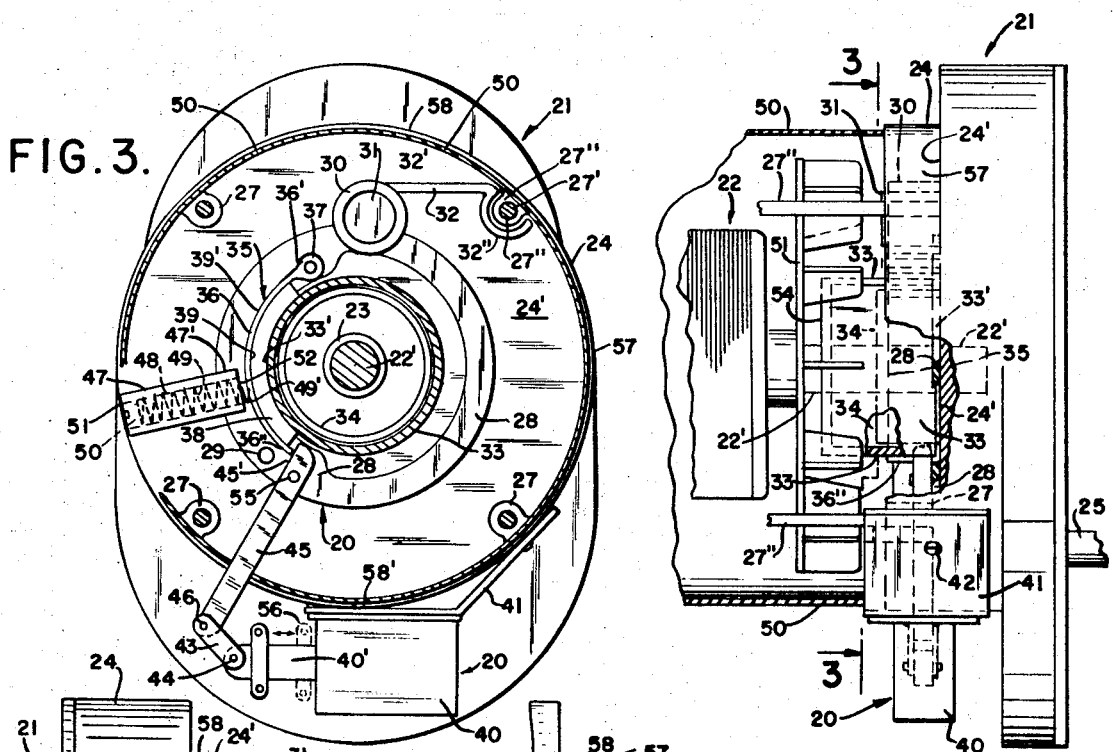
FIG.3.
FIG.2.
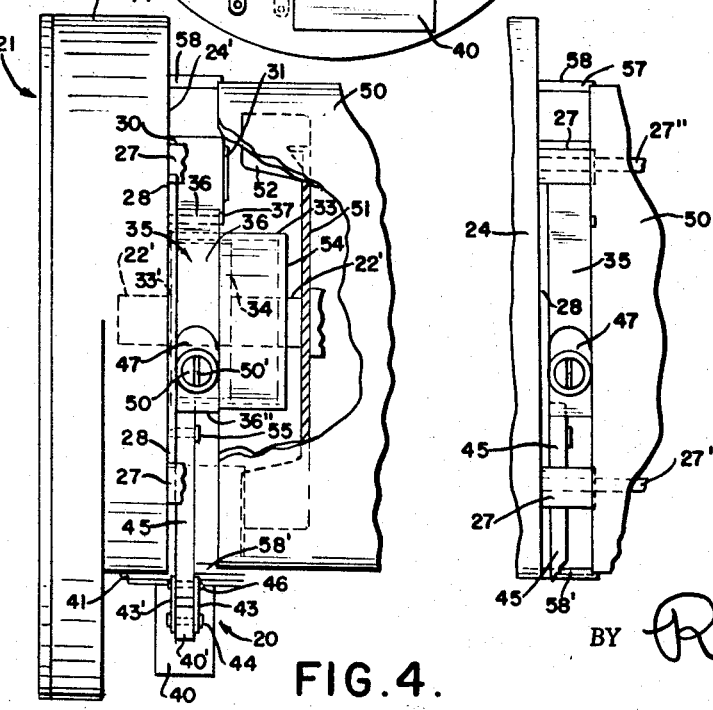
FIG.5.
FIG.4.
INVENTOR
Clair A. Bearfield
Raymond Cole
BY Robert E. Kleve
ATTORNEY 3,579,066

BRAKE MOTOR ATTACHMENT DEVICE

This invention relates to brake mechanisms, more particularly it relates to brakes for electric motors.

It is an object of the invention to provide a novel mechanical brake for an electric motor which will automatically stop the rotation of the motor when the current to the motor has been stopped, to prevent coasting of the motor after the electric power of the motor has been turned off.

It is a further object of the invention to provide a novel mechanical brake mechanism for a reversible motor which enables practically instantaneous reversal of the motor.

It is another object of the invention to provide a novel mechanical brake mechanism to prevent coasting of the motor, which can be easily operated and inexpensively manufactured and produced.

Further objects and advantages of the invention will become apparent as the description proceeds and when taken in conjunction with the accompanying drawing, wherein;

FIG. 1 is a side elevational view of the solenoid operated brake invention shown operatively attached to a conventional electric motor.

FIG. 2 is an enlarged right side elevational view of the mechanical brake invention, with a fragmentary showing of the conventional electric motor, to which it is operatively mounted.

FIG. 3 is a cross-sectional view taken along line 3-3 of FIG. 2.

FIG. 4 is an enlarged left side elevational view of the brake invention, with a fragmentary showing of the conventional electric motor to which it is attached.

FIG. 5 is an exterior view similar to FIG. 4.

Briefly stated, the invention comprises a mechanical brake for an electric motor comprising a solenoid mounted to said motor, a brakeshoe mechanism pivotally mounted to said motor to engage a brakedrum on the rotor shaft of the motor, upon deactuation of the solenoid, to brake the brakedrum and consequently the rotor to an immediate stop, the motor and solenoid actuating and deactuating simultaneously and with the brakeshoe engagement prevent coasting of the motor after the electric current to the motor has been shut off or discontinued.

Referring more particularly to the drawing, in FIG. 1, the solenoid actuated brake invention 20 is illustrated operatively mounted to a conventional electric gearhead reversible motor 21.

The electric motor 21 has a rotor 22 rotatably mounted within the central cylindrical sleeve 50 of the motor with a rotor shaft 22' fixed to the outer end of the rotor and extending into a central bore 23 in the gear reduction housing 24 of the motor 21 and driving the gear reduction gearing within the gear reduction housing 24 which gear reduction gearing in turn drives the output shaft 25 of the motor. The rotor shaft has a conventional disc 51 with six vanes or blades 52 fixed radially about the forward face. The motor 21 has a rear end plate 26 with four screw rods 27" which are threadably received into bores 27' in conventional mounting lugs 27, which mounting lugs 27 are formed integrally with the gear reduction housing 24 at the front end of the motor, with the four screw rods holding the motor in assembled condition in a conventional manner.

The mechanical brake invention 20 has an annular metal mounting ring 28 which is fixed flush against the inner wall 24' of the gear reduction housing 24, by a screw 29 which is threaded into the ring and housing and is flush with the ring 28. A sleeve 30 is welded to the annular ring 28 and is slidably fitted over the projecting cylindrical portion 31 of the inner wall 24' of the gear reduction housing to lock the annular ring 28 to the gear reduction housing.

A metal reinforcement strap 32 has one end 32' welded to the sleeve 30 and has its other end 32" hooked around the mounting lug 27", which is one of the four conventional mounting lugs 27 of the motor, to further lock the annular ring 28 to the gear housing of the motor.

The rotor shaft 22' has a cylindrical drum 33 with an end cap 54 fixed to the drum, which cap in turn is fixed to the rotor shaft 22', fixed axially intermediate its outer end. The drum 33 is hollow and has an open outer end 33' which is adapted to be telescoped coaxially over a projecting cylindrical sleeve 34 in spaced relation, which sleeve 34 is formed integrally with the gear reduction housing. A brakeshoe 35 has an accurate elongated cylindrical plate member 35 which plate member has its one end 36' pivotally mounted to the annular rung 28 by a pin 37. A brakeshoe lining 38 is fixed to the inner face 39 of the accurate plate member 36. The lining 38 is made of conventional fabric material such as felt or other frictional material to create a frictional drag when it engages against the outer surface 33' of the drum 33.

A solenoid 40 is fixed to the outside of the gear housing 24. The solenoid 40 is bolted to an angle iron 41 which angle iron 41 is in turn screwed to the gear housing 24 by a screw 42.

The plunger 40' of the solenoid 40 has a pair of links 43 and 43' which links have their one end pivotally mounted to the plunger 40 by a pin 44 and their other ends pivotally mounted to a lever arm 45 by a similar pin 46.

The lever arm 45 is pivotally mounted to the annular ring 28 by a pin 55. The forward end 45' of the lever arm 45 engages the forward end 36" of the plate member 36 of the brakeshoe 35.

A tube 47 has its forward end 47' welded to the annular ring 28. The tube 47 has a hollow passageway or bore 48 therethrough with a coil spring 49 slidably fitted therein, and a plug 50 threaded into the outer end of the passageway 48 of the tube 47. The bore 48 is threaded from one end 51 to the other end 52, so that the plug 50 may be threaded inwardly toward the brakeshoe to any desired position in the passageway 48. The plug 50 has a slot 50' across its outer face so that a screwdriver may be used to thread the plug in and out of the passageway 48.

The plug 50 is used to compress the outer end 49' of spring 49 against the outer face 39' of the plate member 36 of the brakeshoe 35 and thereby compresses the brake lining 39 against the outer face 33' of the brakedrum. By threading the plug radially inward toward the annular ring 28, the force of the spring against the plate member 36 is increased and consequently by threading the plug 50 in the opposite direction, the force is decreased. Thus, the force of the spring against the plate member 36 may be adjusted to its desired degree by adjustment of the plug 50.

OPERATION

The brake arrangement 20 operates as follows:

The motor 21 and solenoid 40 will be electrically connected in common so that the switches to electrically energizing of the electric motor in either direction will simultaneously electrically energize the solenoid and the electric deenergizing of the motor 21 will simultaneously deenergize the solenoid 40, and the solenoid 40 will remain electrically energized so long as the motor 21 is electrically energized.

When the motor 21 is activated by switching on electric current to the motor it will cause the rotor 22 and its shaft 22' to rotate with the outer end of the shaft, which passes into the bore 23 in the gear housing, engaging and driving the gear reduction gears which gears in turn drive the output shaft 25 of the motor in a conventional manner.

The switch to electrically energize the motor 21 in either direction will simultaneously energize the solenoid 40. The energization of solenoid 40 immediately pulls the plunge 40' of the solenoid inward from its position shown in FIG. 3 and to its position shown in detailed lines and designated by numeral 56, from left to right, when viewed from FIG. 3. The pulling of the plunger 40' inward immediately pulls the linkage 43 and 43' from left to right, which immediately pivots the lever arm 45 counterclockwise from its position shown in solid lines in FIG. 3. The pivoting of the lever arm 45 counterclockwise immediately pivots the plate member 36 clockwise from its position shown in solid lines in FIG. 3, thereby pivoting its brake lining 39 away from the brakedrum 33, and freeing the rotor shaft 22' so that the rotor 22 may rotate freely allowing the motor to operate.

The solenoid 40 will remain actuated, maintaining the brakeshoe lining 39 away from the brakedrum so long as the motor 21 is electrically energized and regardless of which direction the motor was energized.

The electrical deactuation of the motor 21, immediately deenergizes the solenoid 40, which frees the plunger 40' from the magnetic force of the coil 40" of the solenoid. This allows the coil spring 49 to immediately force plate member 36, thereby forcing the brakeshoe lining 39 against drum 33, which causes the lever arm 45 to pivot back to their original position as shown in solid lines in FIG. 3, which shifts the linkage 43 and 43' and the plunger 40' back to their original position and the solenoid 40 may also have its own spring return for its plunger if necessary.

The immediate engagement of the brake lining 39 against the drum 33 upon simultaneous deenergizing of the motor 21, and solenoid 40, immediately locks the brakedrum and thereby brakes and locks the rotor shaft 22' and output shaft 25 to prevent them from continuing to rotate or coast after the motor 21 has been deenergized, and thus bring the rotor and output shaft to an immediate halt, immediately terminating electric current to the motor.

This drag and braking action upon the brakedrum the instant the motor is deenergized prevents the motor from overtravel or coasting and enables the motor to be used in accurate power positioning operations. Also, the immediate braking of the reversible motor prevents instant reversal of the motor, without the delay while the motor coasts to a stop.

Thus it will be seen that a novel brake mechanism has been provided for reversible motors which prevent coasting of the motor after the motor is electrically deactuated.

The amount of brake pressure of the brake member 35 against the brakedrum by the coil spring 48 will be set at less pounds of force than the opposing pounds of force of the solenoid 40.

Varying the size of the solenoid and consequent adjustment of the spring tension can increase or decrease the brake horsepower rating.

The brake arrangement 20 may be easily removed from the motor 21 by removing rod 27 and the end plate 26, the sleeve 50, and the rotor including its disc and vanes and its brakedrum 33. Whereby all the components being fixed to the annular ring 28, by removing the screw 29 the annular ring can be slipped out as the sleeve 30 will slide off the cylindrical projection and the strap 32 will simultaneously slide outward away from the lug 27. The solenoid 40 may be removed by removing the screw 42. Moreover none of the components of the brake invention within the annular edge wall 57 of the gear housing do not project appreciably beyond the outer edge 57 of the edge wall so as not to interfere with the bores 52 of the rotor disc of the rotor.

The annular edge wall 57 is cut away for approximately half of its circumference from location 58 to 58' in a counterclockwise direction when viewed from FIG. 3, which provides an opening to the tube 47, so that a screwdriver may be placed in the slot 50' to adjust the compression of spring 49 without dismantling the motor and to provide an opening for the lever arm 45 to enter into the interior of the motor.

It will be obvious that various changes and departures may be made to the invention without departing from the spirit and scope thereof and accordingly it is not intended that the invention be limited to that specifically described in the specification as illustrated in the drawing but only as set forth in the appended claim wherein:

We claim:

1. A mechanical brake apparatus for an electric motor having a motor housing with a rotor within said housing and a rotor shaft fixed to and extending axially from said rotor, said brake apparatus comprising a cylindrical drum fixed axially to said rotor shaft, an arcuate brakeshoe within said motor housing and movably mounted to said housing, spring means urging said brakeshoe against said drum with said shoe acting to frictionally stop said drum to thereby stop said rotor shaft and rotor, a solenoid mounted to the exterior of said motor housing, a lever pivotally mounted to said housing having one end engaging said brakeshoe, linkage connecting the other end of said lever to said solenoid whereby actuation of said solenoid moves said lever and said lever in turn moves said brakeshoe away from said drum, said solenoid being electrically connected in common with said motor to electrically actuate when said motor actuates, means accessible from the exterior of the motor housing for adjusting the spring means to thereby adjust the amount of frictional engagement of the brakeshoe against the drum.

2. A mechanical brake apparatus for an electric motor having a motor housing with a rotor within said housing and a rotor shaft fixed to and extending axially from said rotor, said brake apparatus comprising a cylindrical drum fixed axially to said rotor shaft, an arcuate brakeshoe within said motor housing and having frictional inner surfaces, said shoe having one end pivotally mounted to said housing to pivot against said drum with its frictional surfaces engaging said drum to frictionally stop said drum and thereby stop the rotor shaft and rotor, spring means within the housing urging said brakeshoe against said drum, a solenoid mounted to the exterior of the motor housing, lever means pivotally mounted to said housing with one end projecting against said brakeshoe and its other end projecting and extending out of said housing, linkage means connecting said other end of said lever to said solenoid whereby said solenoid upon actuation moves said linkage and said linkage in turn pivots said lever and said lever in turn pivots said brakeshoe away from said drum, said solenoid being electrically connected in common with said motor to electrically actuate when said motor actuates, said spring means having rotatable screw means for varying the spring action of said spring means, said housing having an opening with said rotatable screw means adjacent said opening whereby said screw means may be rotated via said opening to vary said spring action without removing said housing from said motor.